US009444618B1

(12) United States Patent
Trimberger et al.

(10) Patent No.: US 9,444,618 B1
(45) Date of Patent: Sep. 13, 2016

(54) DEFENSE AGAINST ATTACKS ON RING OSCILLATOR-BASED PHYSICALLY UNCLONABLE FUNCTIONS

(71) Applicant: Xilinx, Inc., San Jose, CA (US)

(72) Inventors: Stephen M. Trimberger, Incline Village, NV (US); Austin H Lesea, Los Gatos, CA (US)

(73) Assignee: XILINX, INC., San Jose, CA (US)

( * ) Notice: Subject to any disclaimer, the term of this patent is extended or adjusted under 35 U.S.C. 154(b) by 116 days.

(21) Appl. No.: 13/867,429

(22) Filed: Apr. 22, 2013

(51) Int. Cl.
*H04L 9/00* (2006.01)
*H04L 9/34* (2006.01)

(52) U.S. Cl.
CPC ............. *H04L 9/002* (2013.01); *H04L 9/34* (2013.01)

(58) Field of Classification Search
CPC ......................... H04L 9/34; H04L 2209/26
USPC ....................................... 380/2, 44
See application file for complete search history.

(56) References Cited

U.S. PATENT DOCUMENTS

| | | | | |
|---|---|---|---|---|
| 6,313,511 | B1* | 11/2001 | Noguchi | 257/392 |
| 8,290,150 | B2* | 10/2012 | Erhart et al. | 380/44 |
| 8,516,269 | B1* | 8/2013 | Hamlet | G06F 21/00 340/5.8 |
| 8,782,396 | B2 | 7/2014 | Ziola et al. | |
| 2003/0034848 | A1* | 2/2003 | Norman et al. | 331/46 |
| 2007/0081575 | A1* | 4/2007 | Liu et al. | 374/111 |
| 2008/0111638 | A1* | 5/2008 | Thaller | 331/57 |
| 2009/0251171 | A1* | 10/2009 | Butts | H03K 19/0016 326/33 |
| 2009/0288092 | A1* | 11/2009 | Yamaoka | 718/104 |
| 2010/0031065 | A1* | 2/2010 | Futa | H03K 3/0315 713/194 |
| 2011/0033041 | A1* | 2/2011 | Yu | G06F 11/10 380/28 |
| 2011/0128081 | A1* | 6/2011 | Hars | G06F 7/588 331/57 |
| 2011/0191602 | A1* | 8/2011 | Bearden et al. | 713/300 |
| 2011/0196628 | A1* | 8/2011 | Osada | 702/58 |
| 2011/0210798 | A1* | 9/2011 | Koh et al. | 331/57 |
| 2012/0072737 | A1* | 3/2012 | Schrijen | H04L 9/3278 713/189 |
| 2012/0179952 | A1 | 7/2012 | Tuyls et al. | |
| 2012/0182054 | A1* | 7/2012 | Sabapathy et al. | 327/172 |
| 2012/0197570 | A1* | 8/2012 | Ramezani et al. | 702/79 |
| 2012/0286887 | A1* | 11/2012 | Chang | 331/108 R |
| 2013/0047209 | A1* | 2/2013 | Satoh et al. | 726/2 |
| 2013/0058384 | A1* | 3/2013 | Otis et al. | 375/219 |
| 2013/0106461 | A1* | 5/2013 | Ficke et al. | 326/8 |
| 2013/0141137 | A1* | 6/2013 | Krutzik et al. | 326/8 |
| 2013/0234771 | A1 | 9/2013 | Simons et al. | |
| 2014/0225639 | A1* | 8/2014 | Guo | H03K 3/84 326/8 |

OTHER PUBLICATIONS

U.S. Appl. No. 13/867,456, filed Apr. 22, 2013, Trimberger et al.
U.S. Appl. No. 13/867,574, filed Apr. 22, 2013, Trimberger et al.
(Continued)

*Primary Examiner* — Haresh N Patel
(74) *Attorney, Agent, or Firm* — LeRoy D. Maunu

(57) ABSTRACT

Circuits and methods are disclosed for defending against attacks on ring oscillator-based physically unclonable functions (RO PUFs). A control circuit that is coupled to the RO PUF is configured to detect out-of-tolerance operation of the RO PUF. In response to detecting out-of-tolerance operation of the RO PUF, the control circuit disables the RO PUF, and in response to detecting in-tolerance operation, the control circuit enables the RO PUF.

13 Claims, 4 Drawing Sheets

(56) References Cited

OTHER PUBLICATIONS

Bayon, Pierre et al., "Contactless Electromagnetic Active Attack on Ring Oscillator Based True Random Number Generator," *Proc. of the Third International Workshop on Constructive Side-Channel Analysis and Secure Design (CODADE 2012)*, May 21, 2012, 16 pages.

Handschuh, Helena et al., "Hardware Intrinsic Security from Physically Unclonable Functions," *Towards Hardware-Intrinsic Security*, Nov. 3, 2010, pp. 39-53, Springer-Verlag Berlin, Heidelberg, Germany.

Maes, Roel et al., "Physically Unclonable Functions: a Study on the State of the Art and Future Research Directions," in *Towards Hardware-Intrinsic Security: Foundations and Practice (Information Security and Cryptography)* Sedeghi et al., Nov. 3, 2010, pp. 1-36, Springer, USA.

Maiti, Abhranil et al., "Improved Ring Oscillator PUF: An FPGA-friendly Secure Primitive," *J. Cryptology*, Oct. 14, 2010, pp. 375-397, vol. 24, No. 2.

Meguerdichian, Saro et al., "Device Aging-Based Physically Unclonable Functions," *Proc. of the 48th Annual Design Automation Conference*, Jun. 5, 2011, pp. 288-289, ACM, New York, NY, USA.

Morozov, Sergey, "A Comparative Analysis of Delay Based PUF Implementations on FPGA," *IACR Cryptology ePrint Archive*, Dec. 19, 2009, pp. 1-13, International Association for Cryptologic Research (IACR), <http://www.iacr.org>.

Suh, G. Edward et al., "Physical Unclonable Functions for Device Authentication and Secret Key Generation," *Proc. of the 44th Annual Design Automation Conference*, Jun. 4, 2007, pp. 9-14, ACM, New York, NY, USA.

Virginia Tech, *Background on Physical Unclonable Functions (PIFs)*, downloaded Feb. 15, 2013, pp. 1-3, < http://rijndael.ece.vt.edu/puf/background.html>, Virginia Tech Department of Electrical and Computer Engineering, Blacksburg, Virginia, USA.

Xilinx, *Negative-Bias Temperature Instability (NBTI) Effects in 90 nm PMOS*, WP224 (v1.1), Nov. 21, 2005, pp. 1-4, Xilinx, Inc., San Jose, California, USA.

\* cited by examiner

US 9,444,618 B1

DEFENSE AGAINST ATTACKS ON RING OSCILLATOR-BASED PHYSICALLY UNCLONABLE FUNCTIONS

TECHNICAL FIELD

The disclosure generally relates to defending against attacks on ring oscillator-based physically unclonable functions (PUFs).

BACKGROUND

A system's identity may be established and authenticated based on the unique physical properties of the system. In some applications, physically unclonable functions (PUFs) embodied in integrated circuits are used to exploit the unique physical properties of a system for purposes of authentication. Each instance of the IC will have slightly different physical characteristics due to the random variation in an IC fabrication process. Examples of circuits used to implement PUFs include delay circuits and ring oscillators, SRAMs, and cross-coupled latches.

PUFs operate according to a challenge-response protocol. The input to a PUF is the challenge, and the output from the PUF is the response. The slight variations between instances of the PUF circuits in different systems result in the separate instances providing different responses to the same challenge. In addition to authentication, PUF circuits may be used to generate volatile secret keys.

Although a PUF circuit may not be susceptible to the same attacks as those directed at a stored-key authentication circuit, the PUF circuit may be a tempting target to those seeking to gain unauthorized use of a system through discovery and use of the challenge-response pairs of the PUF circuit.

SUMMARY

A circuit includes a ring oscillator-based physically unclonable function ("RO PUF") and a control circuit coupled to the RO PUF. The control circuit is configured to detect out-of-tolerance operation of the ring oscillator-based PUF and disable the ring oscillator-based PUF in response to detecting out-of-tolerance operation. The control circuit is further configured to enable the ring oscillator-based PUF in response to detecting in-tolerance operation.

A method of defending against attacks on a ring oscillator-based physically unclonable function (PUF) includes monitoring operating conditions of the ring oscillator-based PUF. The ring oscillator-based PUF is disabled in response to the operating conditions being out-of-tolerance, and the ring oscillator-based PUF is enabled in response to the operating conditions being in-tolerance.

Other features will be recognized from consideration of the Detailed Description and Claims, which follow.

BRIEF DESCRIPTION OF THE DRAWINGS

Various aspects and features of the circuits and methods will become apparent upon review of the following detailed description and upon reference to the drawings, in which.

DETAILED DESCRIPTION

A ring oscillator-based PUF ("RO PUF") may include a number of pairs of ring oscillators, one pair for each bit of a multi-bit response. A bit of a challenge is input to each ring oscillator in a pair, and the output of the pair may be based on a comparison of the output of each ring oscillator. Due to manufacturing variations, the two ring oscillators in a pair may oscillate at slightly different frequencies, even though the basic layout of the ring oscillators is the same.

A number of attacks may be leveled against an RO PUF in an attempt to influence the behavior of one or more of the ring oscillators. In an attempt to synchronize the oscillator with a particular signal, the power supplied to the oscillator may be modulated or a synchronizing signal may be directly injected to an oscillator to change its natural frequency. Another form of attack is to use an antenna to create an electromagnetic field near the IC having the RO PUF in order to induce currents and/or voltages in the interconnecting wiring of the RO PUF and force synchronization.

To defend against different attacks on an RO PUF, a control circuit may be employed to monitor the RO PUF for an attack and enable or disable the RO PUF accordingly. The control circuit is configured to detect out-of-tolerance operation of the RO PUF and disable the ring oscillator-based PUF circuit in response to detecting out-of-tolerance operation. As long as the control circuit detects in-tolerance operation of the RO PUF, the RO PUF is enabled.

Figure 1:
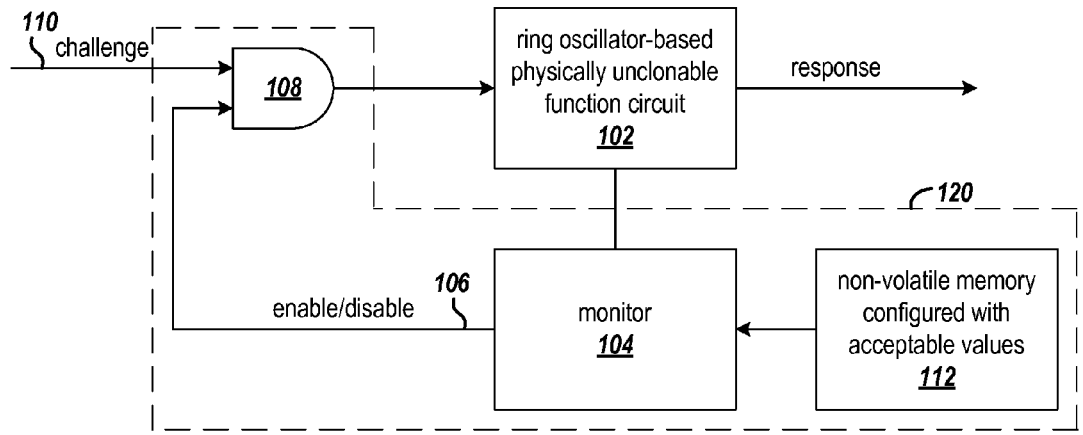
FIG. 1 shows a ring oscillator-based PUF for which operating conditions are monitored for defending against attacks.

FIG. 1 shows a ring oscillator-based PUF 102 for which operating conditions are monitored for defending against attacks. A monitor circuit 104 is coupled to the RO PUF 102 and is configured to check operating conditions such as the current drawn by the ring oscillator-based PUF circuit, the operating frequency of one or more ring oscillators in the PUF circuit, the presence of an electromagnetic field near the ring oscillators in the PUF circuit, and/or the number of cycles for a response bit to be output in response to a challenge bit. Based on whether or not the RO PUF is operating under conditions that are acceptable, the monitor circuit 104 outputs a signal that either enables or disables the RO PUF. The enable/disable signal 106 is input to AND gate 108 along with the challenge signal 110. When the operating conditions of the RO PUF 102 are within an acceptable level of tolerance, the state of the challenge signal is provided as input to the RO PUF. Otherwise, when the operating conditions of the RO POF are not within an acceptable level of tolerance, the input to the RO PUF does not change based on the state of the challenge signal.

In an example implementation, the acceptable or in-tolerance operating conditions may be indicated by one or more values stored in non-volatile memory 112, and the values may be used by the monitor circuit to compare to the operating conditions. Prior to releasing the IC having the RO PUF 102 for general use, the RO PUF may be operated within environments that are expected to be encountered during normal use. The monitored conditions during this period may be used to establish the acceptable conditions. Since there may be a range of acceptable operating conditions within the different environments, the acceptable operating conditions may be specified as a range of values to reflect in-tolerance operating conditions. The monitor circuit 104, AND gate 108, and memory 112 generally form a control circuit 120 that either enables or disables the RO PUF based on the measured operating conditions.

Figure 2:
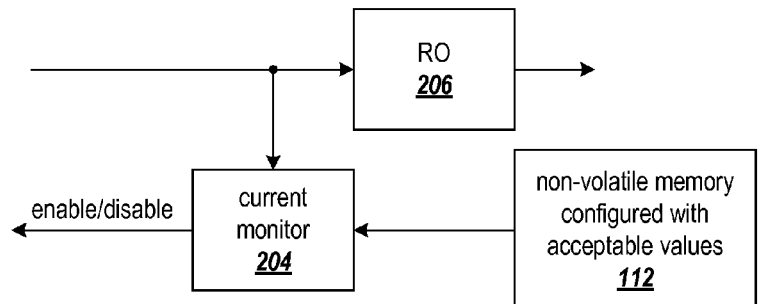
FIG. 2 shows a current monitor coupled to the input of a ring oscillator of a ring oscillator-based PUF for detecting an attack.

FIG. 2 shows a current monitor 204 coupled to the input of a ring oscillator 206 of a ring oscillator-based PUF for detecting an attack on the PUF circuit. The current monitor 204 is configured to monitor a level of current drawn by the ring oscillator 206. An oscillator, when forced to oscillate at a frequency that is not its natural frequency, requires more energy than when oscillating at its natural frequency. Thus, if an attacker is attempting to synchronize the ring oscillator to a frequency other than its natural frequency, there will be a greater level of current drawn by the ring oscillator. The current monitor measures the current level drawn by the ring oscillator and compares the measured current level to an acceptable current level as indicated by a value or range of values in the non-volatile memory 112. If the measured current level is acceptable, the current monitor enables the RO PUF. Otherwise, the RO PUF is disabled.

In one implementation, a single current monitor 204 may be coupled to a single ring oscillator 206 of the multiple ring oscillators that comprise the RO PUF. Alternatively, multiple current monitors may be coupled to multiple ones of the ring oscillators that comprise the RO PUF. Any one of the multiple current monitors reporting an unacceptable current level would disable the RO PUF.

Figure 3:
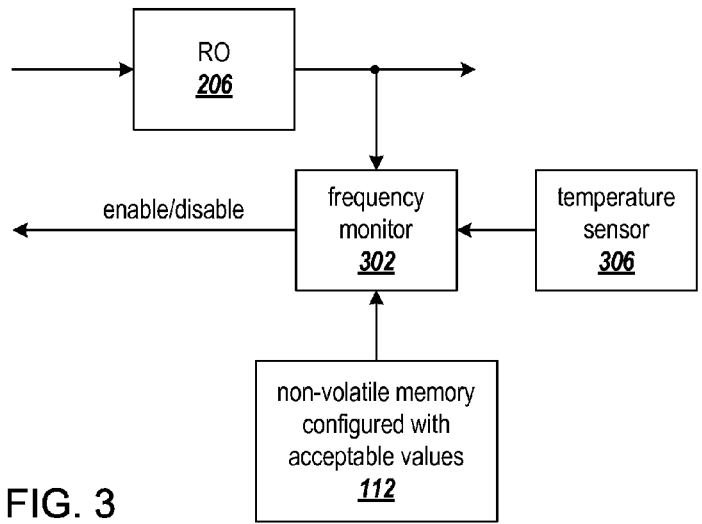
FIG. 3 shows a frequency monitor coupled to the output of a ring oscillator of a ring oscillator-based PUF for detecting an attack.

FIG. 3 shows a frequency monitor 302 coupled to the output of a ring oscillator 206 of a ring oscillator-based PUF for detecting an attack. Some number of cycles are required for a ring oscillator to change from one frequency to another. Thus, from the time of initial application of power to the RO PUF, each ring oscillator will exhibit a profile of frequency versus time. If an attacker is attempting to influence the frequency of a ring oscillator of an RO PUF, the profile of frequency versus time will be different from that when no attack is underway.

The frequency monitor is configured to monitor the frequency the output signal from the ring oscillator. The frequency monitoring may be initiated in response to initial application of power to a ring oscillator of the ring oscillator-based PUF circuit and continue for a selected period of time. The frequency may be sampled at selected intervals within the sample period to construct the frequency-versus-time profile. The frequency monitor may then compare the measured frequency-versus-time profile to a previously generated frequency-versus-time profile stored in the non-volatile memory. In response to the measured frequency-versus-time profile matching the stored frequency-versus-time profile within a chosen level of tolerance, the RO PUF may be enabled. Otherwise, the RO PUF may be disabled. Two or more samples per period may be sufficient. In an example implementation having many ring oscillators, the ring oscillator having the shortest period might be sampled at least five times per period, and the slowest ring oscillator may be sampled approximately 10-15 times per period.

Determining whether or not the measured frequency-versus-time profile matches the acceptable frequency-versus-time profile stored in non-volatile memory 112 may be accomplished in a number of different ways. For example, a standard deviation of the sampled frequencies from an average of the frequencies of the stored frequency-versus-time profile may be used to detect tampering. If the standard deviation is greater than a selected threshold, an attack may be presumed. Other statistical methods may be employed to determine whether or not the measured frequency-versus-time profile matches the stored frequency-versus-time profile.

In another implementation, the number of '0' values and number of '1' values of the ring oscillator signals may be counted to detect an attack. The longest and shortest periods of the ring oscillators of the RO PUF will be known based on the design of the RO PUF. A tolerance may be added to these periods. Using the sampling described above, at least one '0' value and at least one '1' value must be sampled in the sample period. If the sample values are unchanging in the sample period, then the RO PUF is under attack (or broken). Also, if there are too many '0' values and '1' values, the RO PUF is deemed to be under attack.

An independent reference signal may be used as a time base for the sampling. For example, the reference signal would be slower than the fastest ring oscillator, and faster than the slowest ring oscillator. As long as the reference signal is within these bounds, the sampled values are valid.

Since the operating temperature of the IC may significantly influence the frequency of the ring oscillators in an RO PUF, the temperature of the IC may be used in combination with the measured frequency-versus-time profile to determine whether or not the operating conditions of the RO PUF are at an acceptable level. A temperature sensor 306 may be disposed on the IC proximate the RO PUF. At the time the frequency monitor 302 samples the frequency of the output of the RO 206, the frequency monitor reads the output temperature value from the temperature sensor. It will be appreciated that the temperature value may be read slightly before the sample period, during the sample period, or slightly after the sample period. The non-volatile memory may be configured with a number of stored frequency-versus-time profiles, each associated with a different operating temperature. The frequency monitor compares the frequency-versus-time profile and measured temperature to the stored frequency-versus-time profile associated with a temperature corresponding to the measured temperature. It will be appreciated that the measured temperature need not be strictly equal to the stored temperature associated with a stored frequency-versus-time profile. For example, the stored frequency-versus-time profiles may include stored frequency-versus-time profiles associated with 10 degree increments in temperature. The frequency monitor may use the stored frequency-versus-time profile having the associated temperature that is closest to the measured temperature.

Figure 4:
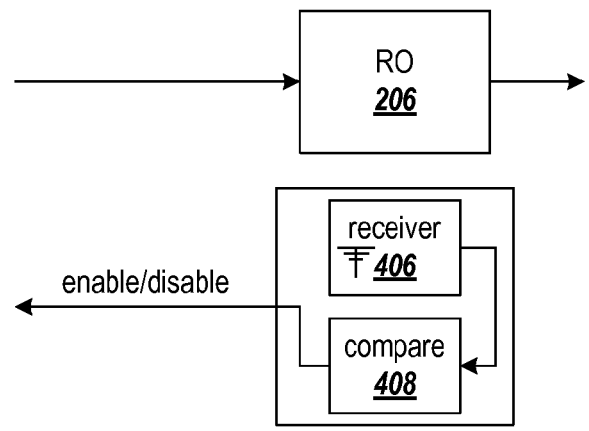
FIG. 4 shows a receiver disposed proximate a ring oscillator of a ring oscillator-based PUF circuit for detecting an attack.

FIG. 4 shows a receiver 406 disposed proximate a ring oscillator 206 of a ring oscillator-based PUF circuit for detecting an attack on the PUF circuit. The circuit of FIG. 4 may be used to defend against attacks in which the attacker uses an electromagnetic field to induce current and/or voltages in the interconnecting wiring of the ring oscillators of an RO PUF.

The receiver 406 includes an antenna element that is tuned to a band of frequencies used by the ring oscillators of the RO PUF. The receiver and antenna element may include a ring oscillator (not shown) that is adjusted by a feedback circuit to have a gain that is just less than the gain required for oscillation. An external electromagnetic field generated by an attacker near the RO PUF and receiver would cause oscillations in the receiver's ring oscillator. The receiver 406 outputs the signal from the ring oscillator to the compare circuit 408.

The compare circuit is configured to determine whether or not the output signal from the receiver is oscillating. A frequency monitor may be used in the compare circuit to determine whether or not the ring oscillator in the receiver is oscillating. No oscillations in the signal output from the receiver indicates that an electromagnetic field attack on the RO PUF is not underway. In response to determining that the signal from the receiver is oscillating, the compare circuit outputs the disable signal to disable the RO PUF. Otherwise, the enable signal is output.

Figure 5:
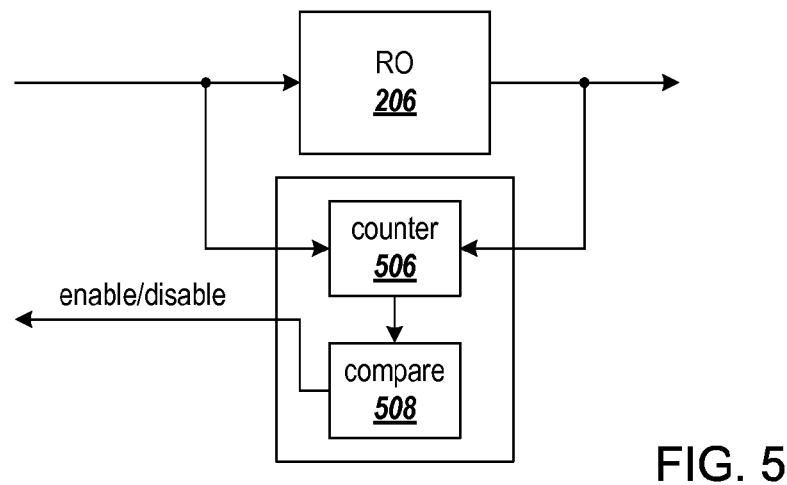
FIG. 5 shows a counter coupled to the ring oscillator of a ring oscillator-based PUF circuit for defending against an attack.

FIG. 5 shows a counter 506 coupled to the ring oscillator of a ring oscillator-based PUF circuit for defending against an attack on the PUF circuit. The counter and compare circuit 508 limit the number of cycles for which the ring oscillators of a ring oscillator-based PUF circuit are enabled to operate in order to limit the influence of external field attacks on the PUF circuit. By operating the RO PUF for the fewest number of cycles needed to establish the response, attempts by an attacker to synchronize the ring oscillators of the RO PUF to a desired signal are limited.

The counter 506 is coupled to the input and the output of the ring oscillator 206. In response to an input challenge bit to the ring oscillator, the counter commences counting cycles of the output signal from the ring oscillator. The current count value is output by the counter to the compare circuit 508. The compare circuit is configured to compare the input count value to a stored value. The stored value is a value that was determined by the maker of the IC and RO PUF to be the number of cycles for each pair of ring oscillators of the RO PUF to output a response bit based on a challenge bit. The compare circuit enables the RO PUF in response to the count value being less than the stored value. Once the count value reaches the stored value, the compare circuit disables the RO PUF.

Figure 6:
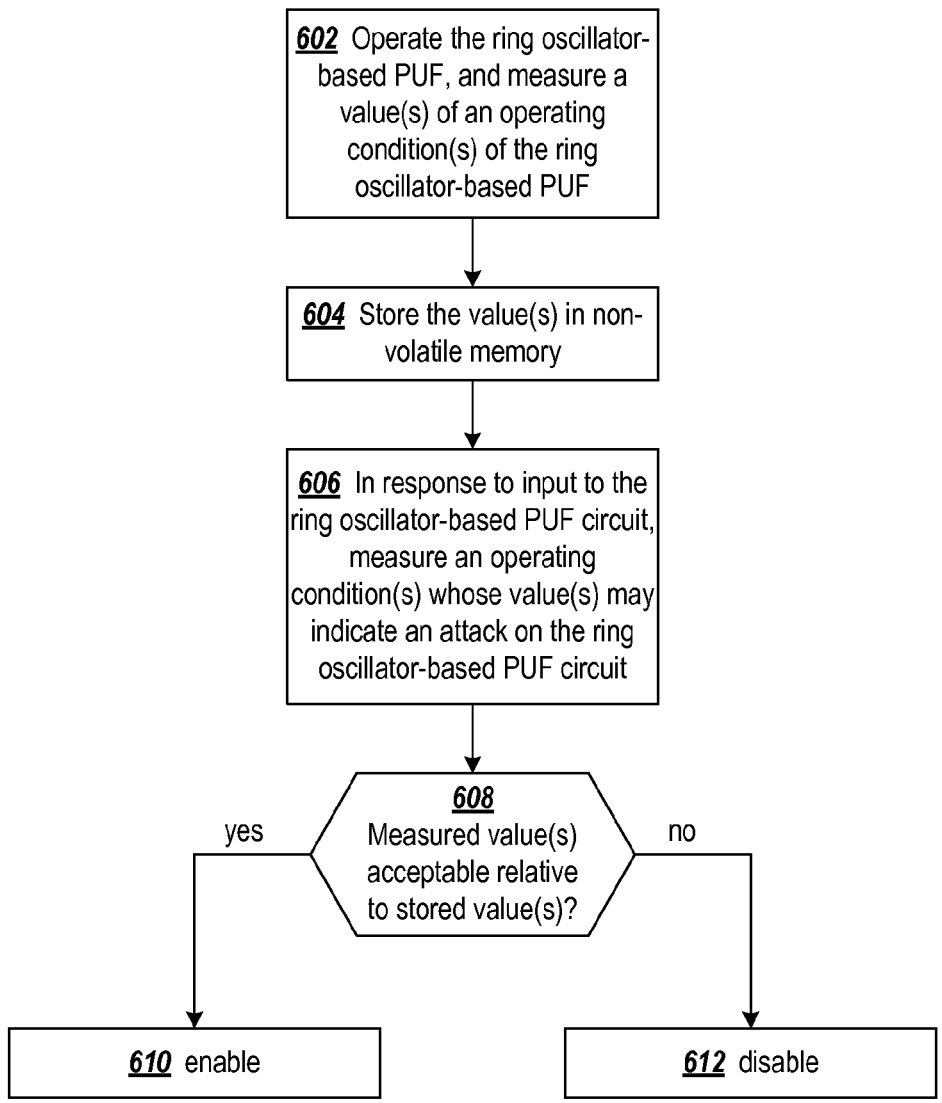
FIG. 6 shows a flowchart of a process for defending a ring oscillator-based PUF circuit against attacks.

FIG. 6 shows a flowchart of a process for defending a ring oscillator-based PUF circuit against attacks. The processing of blocks 602 and 604 is directed to determining the operating conditions that are acceptable for the RO PUF and configuring the IC having the RO PUF with data that describes the acceptable operating conditions. At block 602, the RO PUF is operated by submitting one or more challenges and reading the corresponding one or more responses. During the operation of the RO PUF, the desired operating conditions are measured. As explained above, the operating conditions may include the current drawn by the ring oscillator-based PUF circuit, the operating frequency of one or more ring oscillators in the PUF circuit, the presence of an electromagnetic field near the ring oscillators in the PUF circuit, and/or the number of cycles for a response bit to be output in response to a challenge bit. At block 604, one or more values that represent the acceptable operating conditions are stored in a non-volatile memory of the IC having the RO PUF.

The processing of blocks 606-612 is generally directed to monitoring operating conditions of the RO PUF in order to detect and respond to attacks on the RO PUF. At block 606, one or more operating conditions associated with the RO PUF are measured in response to input to the RO PUF. One or more of the aforementioned operating conditions may be measured. At block 608, the process checks whether or not the measured value(s) are within the acceptable level of tolerance or threshold indicated by the stored value(s). It will be appreciated that the thresholds and tolerances may be chosen according to application requirements. Tighter thresholds and tolerances may provide greater protection against attacks, with a greater possibility of false-positive indications of attacks. Looser thresholds and tolerances would lead to fewer false-positive indications of attack, with a greater possibility of attacks going undetected.

In response to the operating conditions being in-tolerance, the RO PUF is enabled at block 610. In response to the operating conditions being out-of-tolerance, the RO PUF is disabled at block 612.

Figure 7:
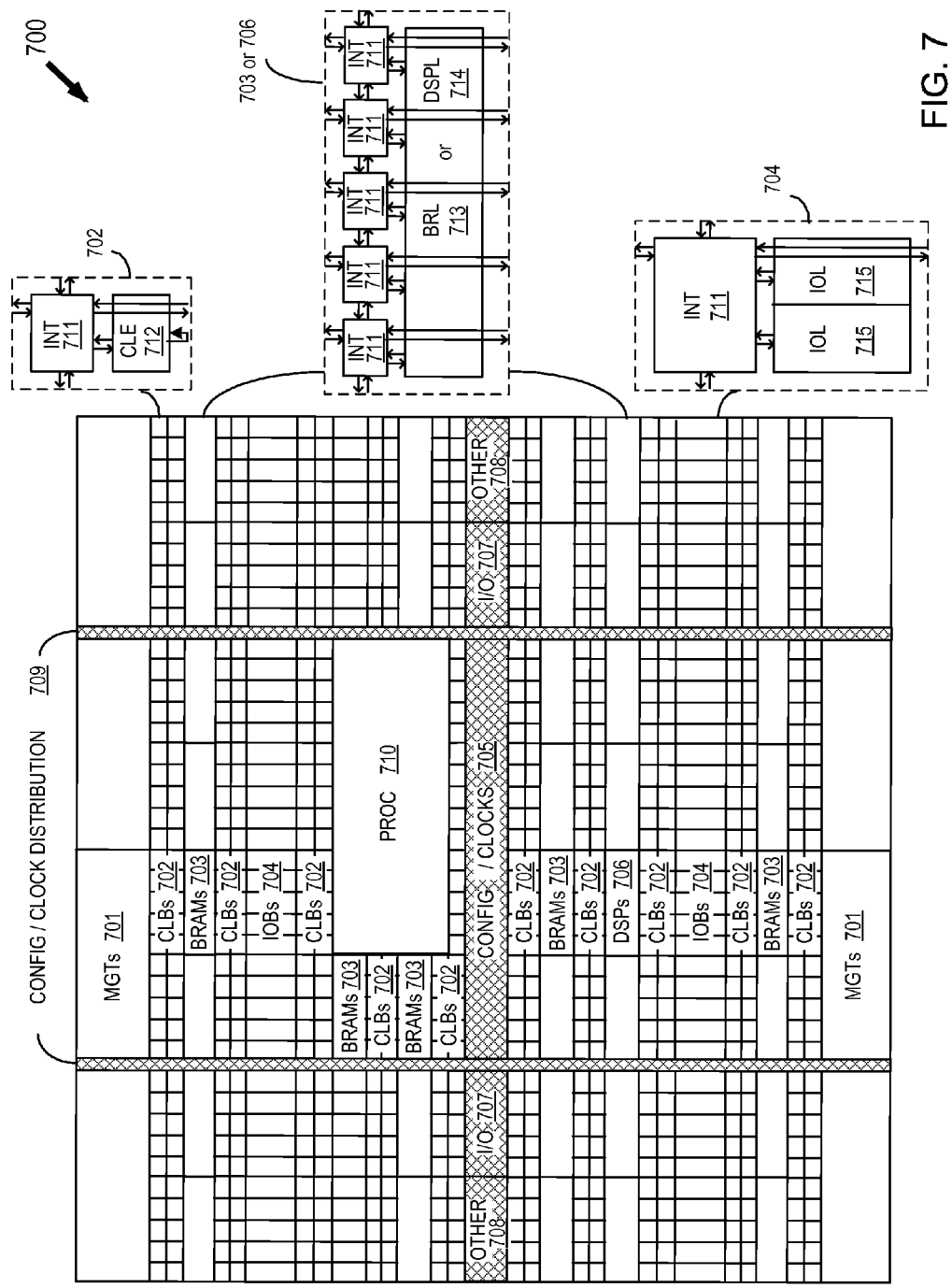
FIG. 7 is a block diagram of an example programmable logic integrated circuit (IC).

FIG. 7 is a block diagram of an example programmable logic integrated circuit (IC) that may be used in implementing an RO PUF and control circuit as described above. The example programmable logic integrated IC is a field programmable gate array (FPGA).

FPGAs can include several different types of programmable logic blocks in the array. For example, FIG. 7 illustrates an FPGA architecture (700) that includes a large number of different programmable tiles including multi-gigabit transceivers (MGTs 701), configurable logic blocks (CLBs 702), random access memory blocks (BRAMs 703), input/output blocks (IOBs 704), configuration and clocking logic (CONFIG/CLOCKS 705), digital signal processing blocks (DSPs 706), specialized input/output blocks (I/O 707), for example, e.g., clock ports, and other programmable logic 708 such as digital clock managers, analog-to-digital converters, system monitoring logic, and so forth. Some FPGAs also include dedicated processor blocks (PROC 710) and internal and external reconfiguration ports (not shown).

In some FPGAs, each programmable tile includes a programmable interconnect element (INT 711) having standardized connections to and from a corresponding interconnect element in each adjacent tile. Therefore, the programmable interconnect elements taken together implement the programmable interconnect structure for the illustrated FPGA. The programmable interconnect element INT 711 also includes the connections to and from the programmable logic element within the same tile, as shown by the examples included at the top of FIG. 7.

For example, a CLB 702 can include a configurable logic element CLE 712 that can be programmed to implement user logic plus a single programmable interconnect element INT 711. A BRAM 703 can include a BRAM logic element (BRL 713) in addition to one or more programmable interconnect elements. Typically, the number of interconnect elements included in a tile depends on the width of the tile. In the pictured FPGA, a BRAM tile has the same width as five CLBs, but other numbers (e.g., four) can also be used. A DSP tile 706 can include a DSP logic element (DSPL 714) in addition to an appropriate number of programmable interconnect elements. An IOB 704 can include, for example, two instances of an input/output logic element (IOL 715) in addition to one instance of the programmable interconnect element INT 711. As will be clear to those of skill in the art, the actual I/O pads connected, for example, to the I/O logic element 715 are manufactured using metal layered above the various illustrated logic blocks, and typically are not confined to the area of the input/output logic element 715.

In the pictured FPGA, a horizontal area near the center of the die (shown shaded in FIG. 7) is used for configuration, clock, and other control logic. Vertical areas 709 extending from this horizontal area are used to distribute the clocks and configuration signals across the breadth of the FPGA.

Some FPGAs utilizing the architecture illustrated in FIG. 7 include additional logic blocks that disrupt the regular row structure making up a large part of the FPGA. The additional logic blocks can be programmable blocks and/or dedicated logic. For example, the processor block PROC 710 shown in FIG. 7 spans several rows of CLBs and BRAMs.

Note that FIG. 7 is intended to illustrate only an exemplary FPGA architecture. The numbers of logic blocks in a row, the relative heights of the rows, the number and order of rows, the types of logic blocks included in the rows, the relative sizes of the logic blocks, and the interconnect/logic implementations included at the top of FIG. 7 are purely exemplary. For example, in an actual FPGA more than one adjacent row of CLBs is typically included wherever the CLBs appear, to facilitate the efficient implementation of user logic.

Though aspects and features may in some cases be described in individual figures, it will be appreciated that features from one figure can be combined with features of one or more others of the figures even though the combination is not explicitly shown or explicitly described as a combination.

The circuits and methods are thought to be applicable to a variety of systems for defending against attacks on RO PUFs. Other aspects and features will be apparent to those skilled in the art from consideration of the specification. The circuits and methods may be implemented as an application specific integrated circuit (ASIC), as a logic on a programmable logic device, or partially in software to be executed by a processor. It is intended that the specification and drawings be considered as examples only, with a true scope of the invention being indicated by the following claims.

What is claimed is:

1. A circuit, comprising:
    a ring oscillator-based physically unclonable function (PUF);
    a control circuit coupled to the ring oscillator-based PUF;
    a non-volatile memory coupled to the control circuit and configured with a plurality of frequency-versus-time profiles, each frequency-versus-time profile associated with a different operating temperature; and
    wherein the control circuit is configured to monitor operating conditions of the ring oscillator-based PUF, disable the ring oscillator-based PUF in response to the operating conditions being out-of-tolerance, and enable the ring oscillator-based PUF in response to the operating conditions being in-tolerance;
    wherein the control circuit includes:
        a temperature sensor configured and arranged to measure a temperature of the ring oscillator-based PUF; and
        a frequency monitor coupled to the temperature sensor and configured and arranged to sample frequencies of a ring oscillator of the ring oscillator-based PUF over a sample period when the temperature is measured, generate a measured frequency-versus-time profile based on the sampled frequencies, and compare the measured frequency-versus-time profile to one of the plurality of frequency-versus-time profiles corresponding to the measured temperature to determine whether or not the sampled frequencies are within an acceptable range for the temperature and detect out-of-tolerance operation of the ring oscillator-based PUF;
    wherein the control circuit is further configured to:
        count 0 values and 1 values of the output signal from the ring oscillator during the sample period;
        detect out-of-tolerance operation of the ring oscillator-based PUF in response to all logic 0 values or all logic 1 values in the sample period;
        monitor a level of current drawn by a ring oscillator of the ring oscillator-based PUF to detect out-of-tolerance operation of the ring oscillator-based PUF;
        monitor a frequency of an output signal from a ring oscillator of the ring oscillator-based PUF for a period of time beginning at initial application of power to the ring oscillator-based PUF to detect out-of-tolerance operation of the ring oscillator-based PUF; and
        monitor an electromagnetic field proximate the ring oscillator-based PUF to detect out-of-tolerance operation of the ring oscillator-based PUF.

2. The circuit of claim 1, wherein the control circuit includes a counter coupled to a compare circuit, the counter configured to count cycles of the ring oscillator of the ring oscillator-based PUF and output a count value to the compare circuit, and the compare circuit configured to enable the ring oscillator-based PUF in response to the count value being less than a stored value, and disable the ring oscillator-based PUF in response to the count value reaching the stored value.

3. The circuit of claim 1, wherein the control circuit includes an input circuit coupled to the ring oscillator-based PUF, and the input circuit is configured and arranged to input an unchanging signal state to a ring oscillator of the ring oscillator-based PUF in response to the operating conditions being out-of-tolerance.

4. The circuit of claim 1, wherein the control circuit is further configured to:
    monitor levels of current drawn by a plurality of ring oscillators of the ring oscillator-based PUF, respectively; and
    detect an out-of-tolerance operation of the ring oscillator-based PUF in response to any one of the levels of current being out of an acceptable range.

5. A circuit, comprising:
    a ring oscillator-based physically unclonable function (PUF);
    a control circuit coupled to the ring oscillator-based PUF; and
    wherein the control circuit is configured to monitor operating conditions of the ring oscillator-based PUF, disable the ring oscillator-based PUF in response to the operating conditions being out-of-tolerance, and enable the ring oscillator-based PUF in response to the operating conditions being in-tolerance;
    wherein the control circuit is further configured to:
        monitor a level of current drawn by a ring oscillator of the ring oscillator-based PUF to detect out-of-tolerance operation of the ring oscillator-based PUF;
        monitor a frequency of an output signal from a ring oscillator of the ring oscillator-based PUF for a period of time beginning at initial application of power to the ring oscillator-based PUF to detect out-of-tolerance operation of the ring oscillator-based PUF; and
        monitor an electromagnetic field proximate the ring oscillator-based PUF to detect out-of-tolerance operation of the ring oscillator-based PUF.

6. The circuit of claim 5, wherein the control circuit is further configured to:
    count 0 values and 1 values of the output signal from the ring oscillator during a sample period; and
    detect out-of-tolerance operation of the ring oscillator-based PUF in response to all logic 0 values or all logic 1 values in the sample period.

7. The circuit of claim 5, wherein the control circuit includes an input circuit coupled to the ring oscillator-based PUF, and the input circuit is configured and arranged to input an unchanging signal state to a ring oscillator of the ring oscillator-based PUF in response to the operating conditions being out-of-tolerance.

8. The circuit of claim 5, wherein the control circuit is further configured to:
monitor levels of current drawn by a plurality of ring oscillators of the ring oscillator-based PUF, respectively; and
detect an out-of-tolerance operation of the ring oscillator-based PUF in response to any one of the levels of current being out of an acceptable range.

9. A method of defending against attacks on a ring oscillator-based physically unclonable function (PUF), comprising:
monitoring by a control circuit, operating conditions of the ring oscillator-based PUF;
wherein the monitoring includes:
monitoring a level of current drawn by a ring oscillator of the ring oscillator-based PUF to detect out-of-tolerance operation of the ring oscillator-based PUF;
monitoring a frequency of an output signal from a ring oscillator of the ring oscillator-based PUF for a period of time beginning at initial application of power to the ring oscillator-based PUF to detect out-of-tolerance operation of the ring oscillator-based PUF;
monitoring an electromagnetic field proximate the ring oscillator-based PUF to detect out-of-tolerance operation of the ring oscillator-based PUF;
disabling the ring oscillator-based PUF in response to the operating conditions being out-of-tolerance; and
enabling the ring oscillator-based PUF in response to the operating conditions being in-tolerance.

10. The method of claim 9, further comprising inputting an unchanging signal state to the ring oscillator of the ring oscillator-based PUF in response to the operating conditions being out-of-tolerance.

11. The method of claim 9, further comprising:
monitoring levels of current drawn by a plurality of ring oscillators of the ring oscillator-based PUF, respectively; and
detecting an out-of-tolerance operation of the ring oscillator-based PUF in response to any one of the levels of current being out of an acceptable range.

12. The method of claim 9, wherein the monitoring operating conditions includes:
counting oscillations of a ring oscillator of the ring oscillator-based PUF and generating a count value;
comparing the count value to a stored value;
enabling the ring oscillator-based PUF in response to the count value being less than the stored value; and
disabling the ring oscillator-based PUF in response to the count value reaching the stored value.

13. The method of claim 9, wherein the monitoring operating conditions includes comparing one or more values indicative of in-tolerance operating conditions of the ring oscillator-based PUF to one or more measured values indicative of the operating conditions of the ring oscillator-based PUF.

* * * * *